May 31, 1927.
C. S. MORSE
1,630,350
RESILIENT TIRE
Filed Jan. 23, 1926        2 Sheets-Sheet 1
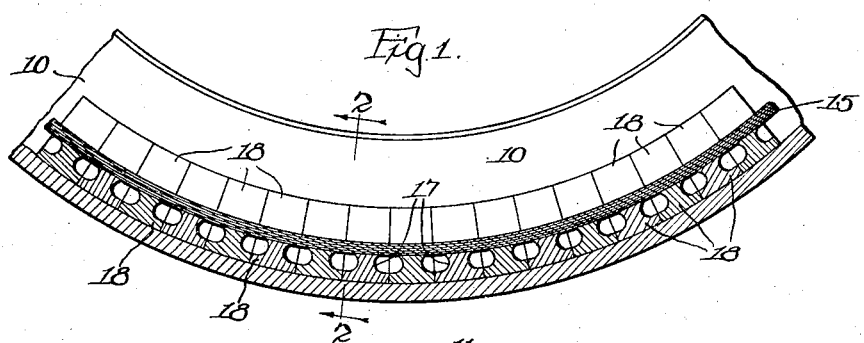
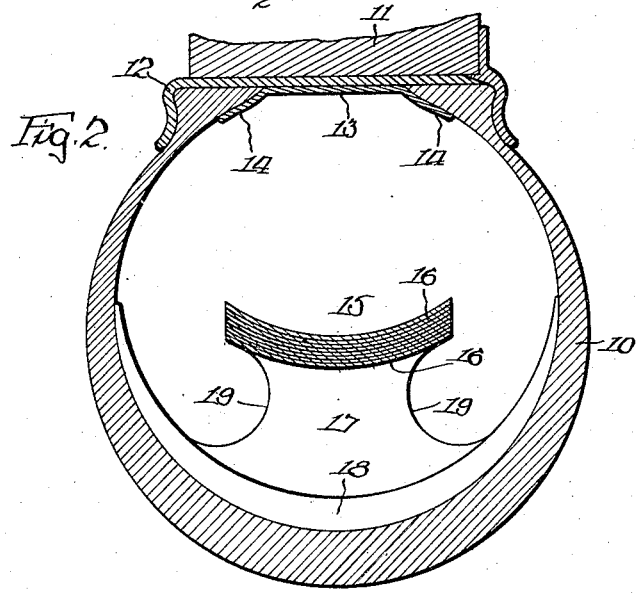
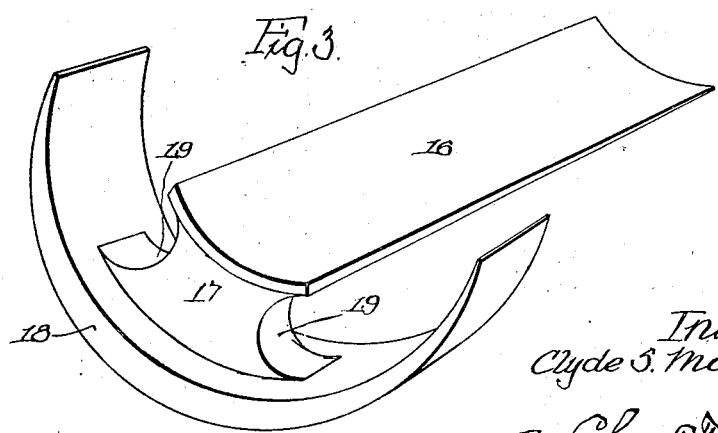
Inventor:
Clyde S. Morse
By Chas. C. Tillman
Atty.

May 31, 1927.
C. S. MORSE
1,630,350
RESILIENT TIRE
Filed Jan. 23, 1926      2 Sheets-Sheet 2
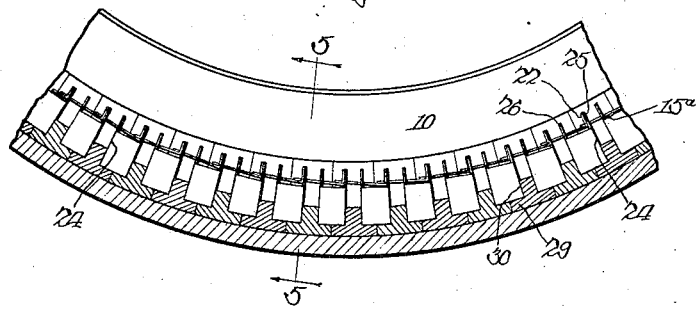
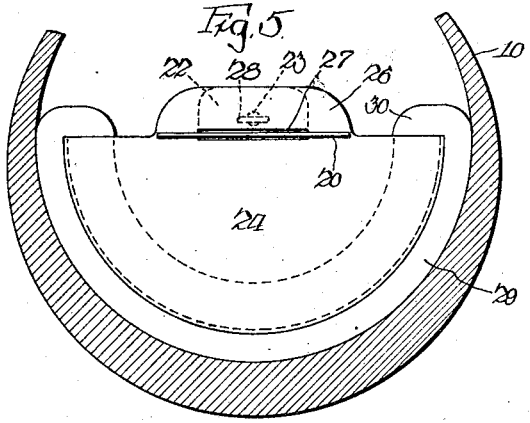
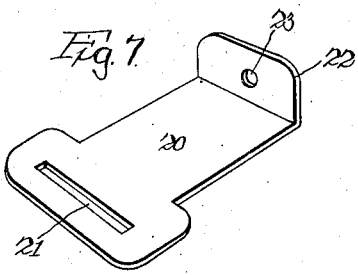
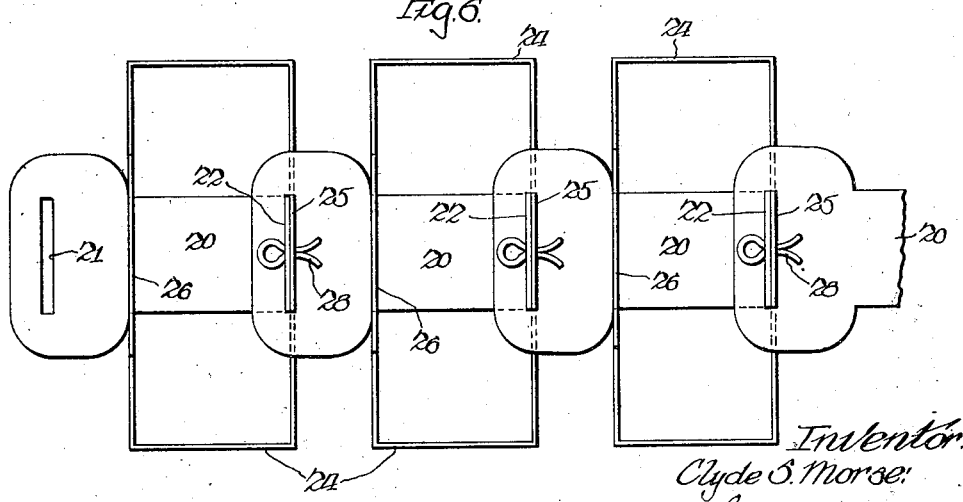
Inventor:
Clyde S. Morse
By Chas. C. Tillman
Atty.

Patented May 31, 1927.

1,630,350

UNITED STATES PATENT OFFICE.

CLYDE S. MORSE, OF DE KALB, ILLINOIS.

RESILIENT TIRE.

Application filed January 23, 1926. Serial No. 83,214.

My present invention embodies the same general principle and is somewhat similar in construction to that disclosed in Patent No. 1,382,376, issued June 21, 1921, for improvements in resilient tires.

Like the patented construction my present invention relates to improvements in tires, and more particularly to that class of tires used for motor driven vehicles, such as, automobiles, and of the type employing a distended casing for each wheel of the vehicle.

The present invention like the structure set forth in the aforesaid Letters Patent has for one of its objects to provide a resilient tire of such construction and arrangement of its parts that the casing of an ordinary pneumatic tire, whether new or used, may be employed as one of the elements of the invention and may be kept properly distended by means of my improvements, thereby dispensing with the use of the ordinary pneumatic inner tube.

Another object of the invention is, to furnish a practically puncture proof shock absorbing tire, having great strength, durability and the required resiliency, to be used in lieu of a pneumatic inner tube tire.

Other objects and advantages of the invention will be disclosed in the following description and explanation, which will be more readily understood when read in conjunction with the accompanying drawings, in which embodiments of which the invention is susceptible are illustrated, it being understood that modifications and changes may be resorted to so long as they fall within the scope of the annexed claims forming a part of this specification.

Referring now to the drawings—

Fig. 1 is a circumferential sectional view taken through a portion of an ordinary tire casing with my improvements in about the positions they will occupy when in use.

Fig. 2 is an enlarged cross sectional view taken on line 2—2 of Fig. 1 looking in the direction indicated by the arrows.

Fig. 3 is an enlarged detached perspective view of one of the sections or members of the yieldable band which carries the supporting members for the casing.

Fig. 4 is a similar view to that shown in Fig. 1 illustrating a modification in the construction of the band and supporting members for the casing.

Fig. 5 is an enlarged cross sectional view taken on line 5—5 of Fig. 4 looking in the direction indicated by the arrows.

Fig. 6 is a greatly enlarged plan view of a portion of the yieldable band of the modified form and a portion of the members which it carries, said parts being shown as detached from the casing, and Fig. 7 is a perspective view of one of the connections or links employed in this modified construction.

Like numerals of reference refer to corresponding parts throughout the different views of the drawings.

With special reference to Figs. 1 to 3 inclusive of the drawings, the tire casing is indicated by the reference numeral 10, and may be of the ordinary or well known or preferred construction and material. This tire may be adapted for engagement with a rim 11, of any desired type but in the present instance I have shown the rim or the felly 11, equipped with a demountable rim 12, of the well known construction and engaging the inner peripheral portion in contra-distinction to the tread portion of the tire casing with an internally disposed band 13, which has its side portions deflected as at 14, and rest against the inner surface of the casing thereby firmly securing it in the demountable rim, as will be clearly understood by reference to Fig. 2 of the drawing.

The improved yieldable band and its associated elements is located circumferentially within the casing 10, at the outer periphery or tread portion thereof and normally concentrically therewith.

In the form of the invention now under consideration the band which is yieldable, is designated as a whole by the reference numeral 15, and comprises a plurality of sections or straps 16, of any desired width, thickness and length, superimposed one on the other and secured together in any suitable manner, such as, by means of vulcanization.

As shown in Fig. 3, each of the sections or straps 16, is secured transversely at one of its ends to a web or inwardly projecting part 17, of a segmental tread member 18, and is tapered towards its opposite end. The parts 16, 17, and 18, are by preference made of rubber, yet other material may be employed in their construction. Each of the parts 17, is provided on each of its sides with about a semi-circular cut-away part 19, thus providing a wider base from which the strap 16, is extended and also affording more flexibility to the part 17, as well as the extreme side portions of the part 18, which constitute the supporting members carried by the yieldable band.

As shown, the parts 18, are segmental or crescent shaped and abut against one another so that their flaps or sections 16, will overlap one another and so that they may be vulcanized or otherwise secured together one above the other. By this arrangement it is evident that the band 15 as provided with tread members 18, can be completed or formed of such a size as to snugly fit within the casing 10, and against the tread portion thereof, the resiliency of the band being utilized for constantly pressing the supporting members or tread portions 18, through their webs 17, against the casing.

In Figs. 4 to 7 inclusive of the drawings, I have shown a modification in the construction of the device, which consists in employing a casing 10, of the above named construction and which may be fitted to a felly 11, by means of a demountable rim 12, and an internal band or ring 13, as shown in Fig. 2 and above described, or the casing 10, may be attached to the rim of a wheel in any other suitable manner. In this modified construction the yieldable band is designated as a whole by the numeral 15$^a$, and comprises a plurality of elongated sections or pieces 20, of flexible material of any suitable kind, but preferably metal. Each of these sections or pieces 20, is provided near one of its ends with a transversely disposed slot 21, and at its other end with an inwardly turned flange 22, which has at about its middle an opening 23, of a size to receive a small cotter pin or other fastening. These links or sections 20, are joined together in the following manner and carry on their outer surfaces hollow supporting members or jaws 24, each of which is segmental in shape as shown in Fig. 5, and each has at one of its straight edges an inwardly extended orificed flange 25, and on its opposite edge an inwardly extended flange 26, which latter flange is provided with a slot 27, arranged longitudinally with respect to said flange and located at about the free edge of the side of the member 24, from which the flange 26, extends. Thus it will be understood that by first placing the flange 22, on one of the sections 20, so that it can enter the slot 27, of one of the members 24, and then by passing the section 20, through said slot until the flange 22, thereon abuts against the inner surface of the flange 25, on said member the two flanges 22, and 25, can be secured together by means of a cotter pin 28, or other suitable fastening. The piece 20, can then be positioned in such a way as to receive in its slot 21, the flange 25, of the adjacent member 24, or jaw. This means of connecting the sections or pieces 20, together may be employed throughout the formation of a band which will be of sufficient size to fit snugly within the casing 10, in which position it will be understood that the hollow members 24, will be slightly spaced from each other, and will extend towards the outer periphery or tread portion of the casing. Before the yieldable band 15$^a$, is placed in the aforesaid position a tread member 29, having a segmental web 30, and made of rubber is placed with its web 30, interposed between each pair of the members or jaws 24, so that in the action of the band, by reason of the compression due to the load on the wheel, the hollow members 24, will be caused to grasp or clamp the webs 30, therebetween.

It will be obvious by reference to Figs. 4 and 5 of the drawings, that each of the tread members 29, is much wider in cross section than its web 30, and that these widened portions will contact at their adjacent edges with one another thus forming a support for the entire inner tread portion of the casing, that is, without any spaces between the said tread members.

By making the band 15$^a$, out of flexible or yieldable material and by making the members 24, which really form a part of said band, out of sheet metal and hollow, it is obvious that such parts will have but little weight and may be economically formed by the punch press process.

From the foregoing and by reference to the drawings, it will be readily understood and clearly seen that either construction shown and described, will afford a flexible, or yieldable band, and that by reason of the peculiar construction of the parts carried by the band and associated therewith, a complete support for the outer peripheral or tread portion of the casing is provided without any spaces intervening between the parts of the tread members, thus affording a more satisfactory support for said casing than if the tread members were out of contact with one another at their adjacent edges.

Furthermore, it will be understood that the supporting portions of the tread members of either construction described and shown, being made of resilient material, will augment the action of the bands.

It is further apparent that by employing a tire embodying my improvements, great efficiency, durability, resiliency and economy of manufacture and ease of assemblage of the parts will be afforded, and that if the tire casing is punctured or badly cut a resilient tire will still be furnished by reason of the novel and peculiar construction and arrangement of the supporting band and its parts.

Having thus fully described my invention, what I claim as new and desire to secure by Letters Patent is—

1. In a resilient tire, the combination of a circular casing, with a yieldable band located therein at a distance from the tread or outer portion thereof and a plurality of transversely disposed resilient tread engaging members carried by said band on its outer surface, each of said members having its outer portion widened circumferentially with respect to the casing and in contact with the corresponding portions of adjacent ones of said members to impart resiliency to said band and to form an unspaced support to the casing.

2. In a resilient tire, the combination of a circular casing, with a yieldable band located therein at a distance from the tread or outer portion thereof, a plurality of flexible or resilient members transversely disposed and secured to the outer surface of said band and a transversely disposed resilient tread engaging member secured to the outer portion of each of said first named resilient members, said tread members, contacting with one another at their transverse edges.

CLYDE S. MORSE.